United States Patent [19]
Leonard et al.

[11] Patent Number: 4,796,034
[45] Date of Patent: Jan. 3, 1989

[54] COMPACT CAMERA WITH FLASH UNIT

[75] Inventors: Bruce A. Leonard, Honeoye Falls, N.Y.; James S. Couch, Powell; Robert W. Mervar, Columbus, both of Ohio

[73] Assignee: Eastman Kodak Company, Rochester, N.Y.

[21] Appl. No.: 168,813

[22] Filed: Mar. 16, 1988

[51] Int. Cl.⁴ ............................................. G03B 15/05
[52] U.S. Cl. .......................... 354/145.1; 354/149.11; 354/288
[58] Field of Search ................. 354/126, 145.1, 149.1, 354/149.11, 219, 288

[56] References Cited

U.S. PATENT DOCUMENTS

| | | | |
|---|---|---|---|
| 2,688,071 | 8/1954 | Wright | 354/126 |
| 3,169,708 | 2/1965 | D'Incerti | 354/149.11 |
| 4,166,680 | 9/1979 | Maitani | 354/126 |
| 4,319,818 | 3/1982 | Sawara | 354/145.1 |
| 4,350,420 | 9/1982 | Engelsmann et al. | 354/126 |
| 4,557,571 | 12/1985 | Reibl | 354/149.11 |
| 4,666,275 | 5/1987 | Tamamura | 354/126 |

FOREIGN PATENT DOCUMENTS 2106261A 4/1983 United Kingdom ............... 354/126

Primary Examiner—A. A. Mathews
Attorney, Agent, or Firm—Roger A. Fields

[57] ABSTRACT

A compact camera includes an elongate electronic flash unit that is mounted at the rear of the camera body, proximate a rear viewfinder window, for rotation generally about the viewfinder window. The flash unit is rotatable between a folded inoperative position within a recessed area of the camera body and an erect operative position sufficiently higher than the camera lens to substantially prevent red-eye druing a flash exposure.

5 Claims, 6 Drawing Sheets

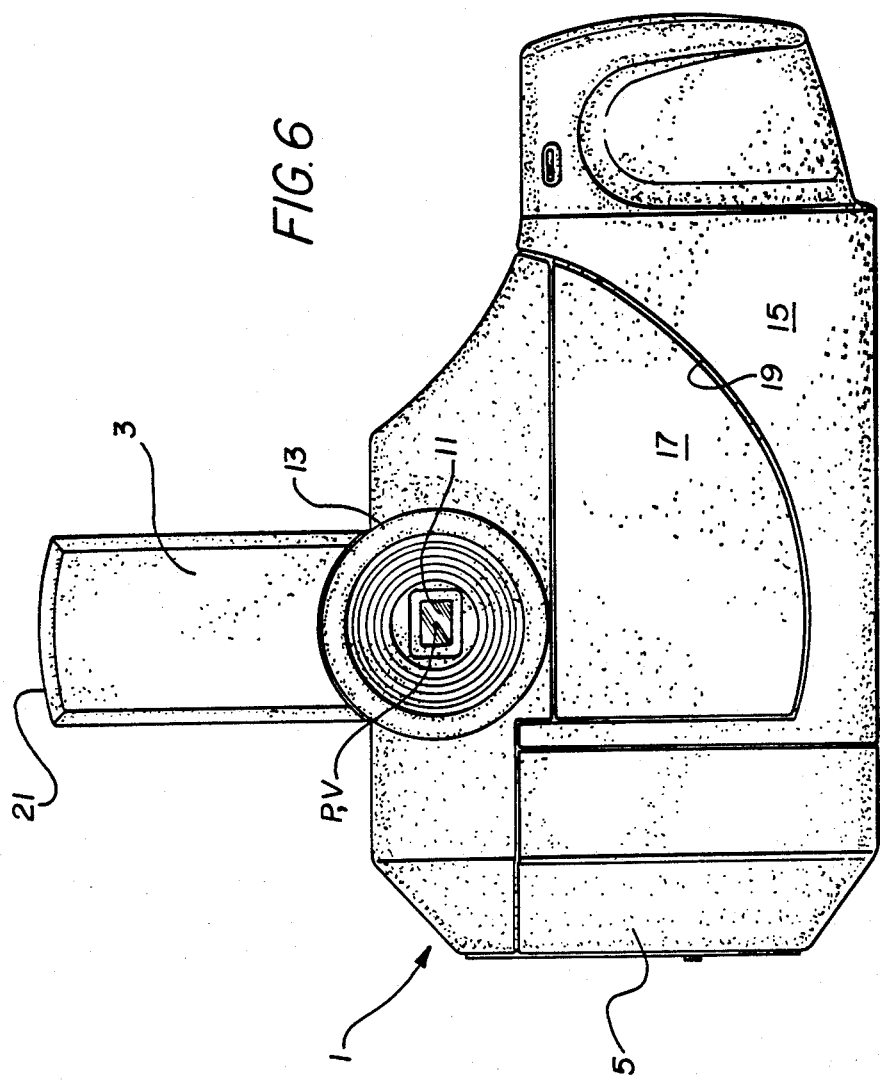

COMPACT CAMERA WITH FLASH UNIT

CROSS-REFERENCE TO A RELATED APPLICATION

Reference is made to commonly assigned, copending U.S. application Ser. No. 169,184 entitled COMPACT CAMERA WITH FLASH UNIT and filed Mar. 16, 1988 in the names of Bruce A. Leonard, James S. Couch, and Robert W. Mervar.

BACKGROUND OF THE INVENTION

1. Field of the Invention

The invention relates generally to photographic cameras, and more particularly to a compact camera with a built-in flash unit.

2. Description of the Prior Art

A current trend in camera design is to incorporate an electronic flash unit in the camera body and yet make the body relatively small in size in order to increase its ease of storage, portability, and handling. Examples of smaller size cameras with built-in electronic flash units are the disk film cameras, such as sold by Eastman Kodak Company, and the compact 35 mm cameras, such as sold by Nikon, Inc. As a consequence of making a camera body smaller in size, the separation between a built-in flash unit and the taking lens is reduced, thereby possibly creating an undesirable effect commonly known as "red-eye". When using a flash unit and a color print film, red-eye is typified by the pupils in the eyes of a person being photographed coming out red-tinted on a developed color print. Such a phenomenon is attributable to the incidence, into the taking lens, of the red light reflected from the retinas in the person's eyes illuminated by the flash light.

Red-eye may be substantially avoided by increasing the separation between the flash unit and the taking lens. As a result, light from the flash unit will reach the eyes of a person being photographed at too great an angle to be reflected by his retinas into the taking lens.

In U.S. Pat. No. 2,688,071, issued Aug. 31, 1954 and U.S. Pat. No. 4,557,571 issued Dec. 10, 1985, red-eye appears to be substantially avoided without increasing the size of the camera body to any great degree, by providing a built-in electronic flash unit that is pivotable with respect to the camera body. The flash unit is pivotable between a folded inoperative position in which it is located within a recessed area at a front or rear face of the camera body to form an integrated part of the camera body, and an erect operative position in which it is removed from the recessed area and is elevated sufficiently higher than the taking lens to permit picture-taking usually without the occurrence of red-eye. However, in both of the patents, the flash unit must be swung in an arc away from the camera body to locate the flash unit in its erect position. This is cumbersome and adds to the perception of a bulky camera.

Another approach which, unlike the first two examples, does not add to the perception of a bulky camera is disclosed in U.S. Pat. No. 4,666,275, issued May 19, 1987. In that patent, the flash unit is rotatable about the taking lens, generally in a plane substantially parallel to a front face of the camera body to effect horizontal or vertical format picture-taking. However, since the flash unit is rotatable about the taking lens, the separation between the flash unit and the lens is not as great as in the first two examples, and the possibility of red-eye is increased.

SUMMARY OF THE INVENTION

As compared to the prior art examples described above, the invention advantageously provides a photographic camera and an integral flash unit with improved compactness and the facility to substantially avoid red-eye.

The invention is embodied in a compact camera having a built-in electronic flash unit which is swingable relative to the camera body. As in the prior art examples described above, the flash unit is swingable generally between a folded inoperative position against the camera body and an erect operative position elevated higher than the taking lens. However, in contract to the prior art examples, the flash unit is swung about a pivot axis which extends through a rear viewfinder window on the camera body. This arrangement allows for improved compactness, in that the flash unit does not have to swing in an arc away from the camera body as in U.S. Pat. Nos. 2,688,071 and 4,557,571, and it decreases the possibility of red-eye occurrence as compared to the flash camera in U.S. Pat. No. 4,666,275.

BRIEF DESCRIPTION OF THE DRAWINGS

The invention will be described in connection with the drawings, wherein:

FIG. 6 is a rear elevation view of the compact camera, showing the flash unit in its erect operative position.

DETAILED DESCRIPTION OF THE PREFERRED EMBODIMENT

The invention is described as being embodied in a compact 35 mm camera with a built-in electronic flash unit. Because such photographic cameras have recently become well known, this description is directed in particular to camera elements forming part of or cooperating directly with the preferred embodiment. It is to be understood, however, that camera elements not specifically shown or described may take various forms known to persons of ordinary skill in the art.

Figure 1:
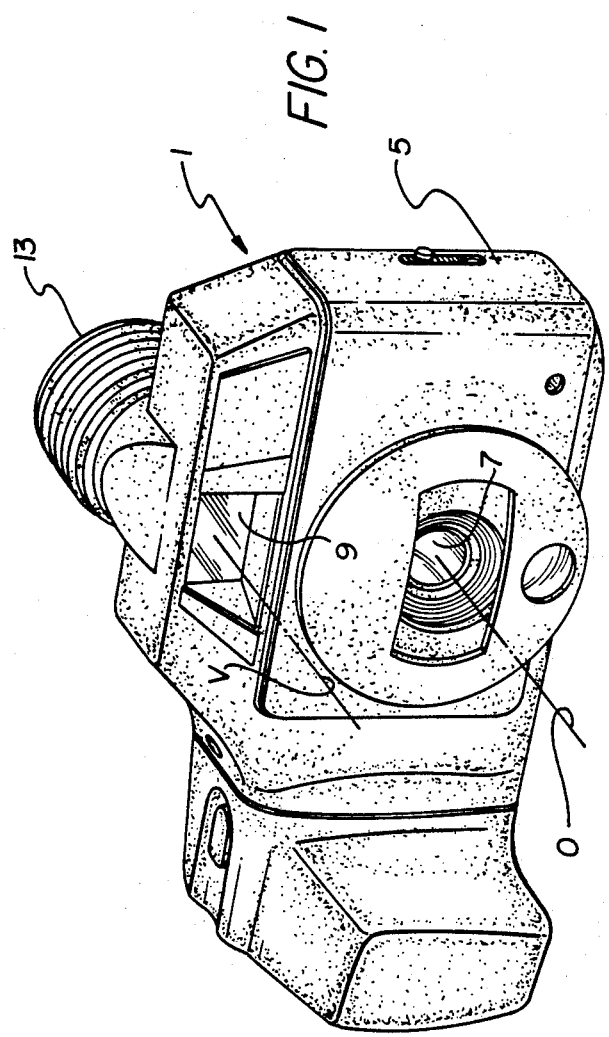
FIG. 1 is a front perspective view of a compact camera with a built-in electronic flash unit according to a preferred embodiment of the invention.
Figure 2:
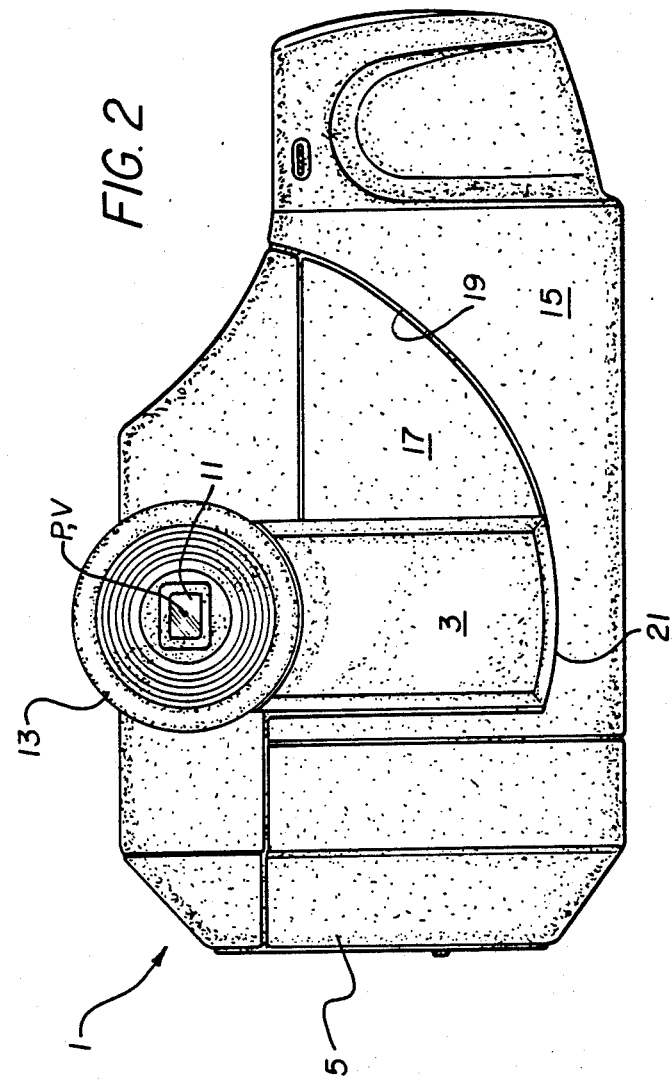
FIG. 2 is a rear elevation view of the compact camera, showing the flash unit in a folded inoperative position.
Figure 3:
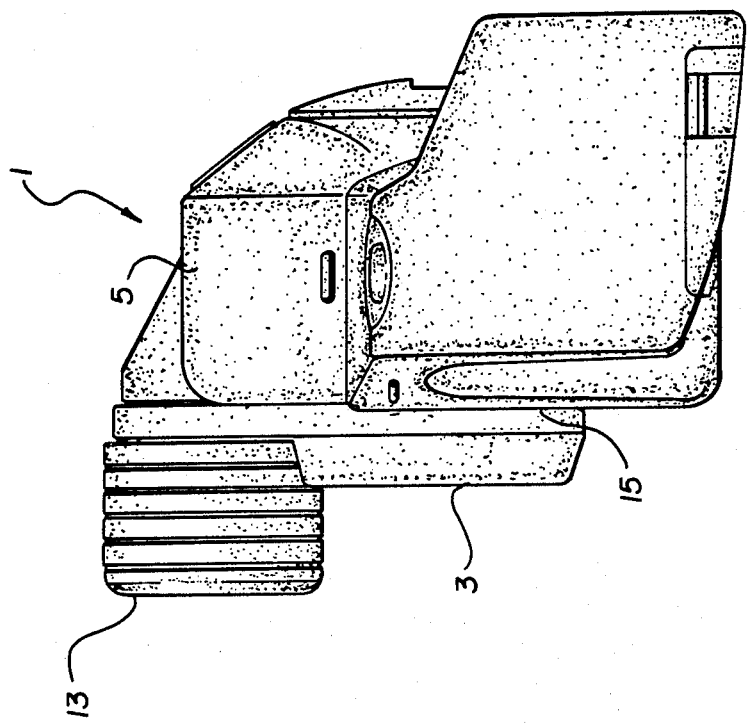
FIG. 3 is a side elevation view of the compact camera, showing the flash unit in its folded inoperative position.

Referring now to the drawings, FIGS. 1, 2 and 3 depict the front, rear, and one side of a compact 35 mm camera 1 provided with a built-in electronic flash unit 3. The camera body 5 includes a taking lens 7 having a lens axis or optical axis 0, and front and rear aligned viewfinder windows 9 and 11 having a common viewing axis V. The viewing axis V, as shown inn FIG. 1, extends directly above and substantially parallel to the optical axis 0. An eye-cup 13, preferably constructed of a rubber-like material, surrounds the rear viewfinder window 11.

The flash unit 3 is pivotable with respect to the camera body 5, generally about the rear viewfinder window 11 and in a plane substantially parallel to a rear face 15 of the camera body. Preferably, the pivot axis P of the flash unit 3 extends in coaxial relation with the viewing axis V through the rear viewfinder window 11. See FIGS. 2 and 6. As illustrated, the flash unit 3 is pivotable 180° between a folded or inverted inoperative position in which it is located within a recessed area 17 at the rear face 15 of the camera body 5 to form an integrated part of the body, and an erect operative position in which it is removed from the recessed area and is elevated higher than the taking lens 7 and the rear viewfinder window 11. The recessed area 17 is bordered by a concave-shaped edge 19 evenly spaced from the pivot axis P, and the flash unit 3 has a convex-shaped edge 21 arranged in contiguous relation with the concave-shaped edge as the flash unit is swung from and to its folded position within the recessed area. When the flash unit 3 is in its erect position, as shown in FIG. 5, a flash emission window 23 of the flash unit is located sufficiently higher than the taking lens 5 to substantially prevent red-eye occurrence during a flash exposure.

Figure 4:
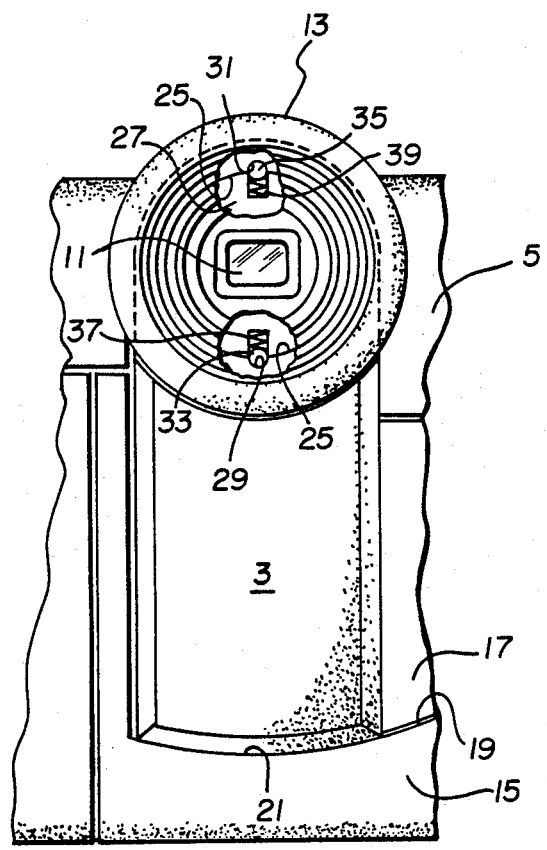
FIG. 4 is a rear elevation view of the mounting means which supports the flash unit on the compact camera.

Mounting means for supporting the flash unit 3 for movement between its folded and erect positions is shown in FIG. 4. As shown, the flash unit 3 includes a bore 25 in which an elongate support member 27 for the rear viewfinder window 11 is disposed. The bore 25 and the support member 27 are complementary shaped to enable the flash unit 3 to rotate generally about the rear viewfinder window 11. The flash unit 3 has a pair of opposite facing semi-hemispherical recesses 29 and 31 which receive respective sprung-urged steel balls 33 and 35, partially located in corresponding pockets 37 and 39 in the support member, to releasably secure the flash unit in its folded or elevated position.

OPERATION

Figure 5:
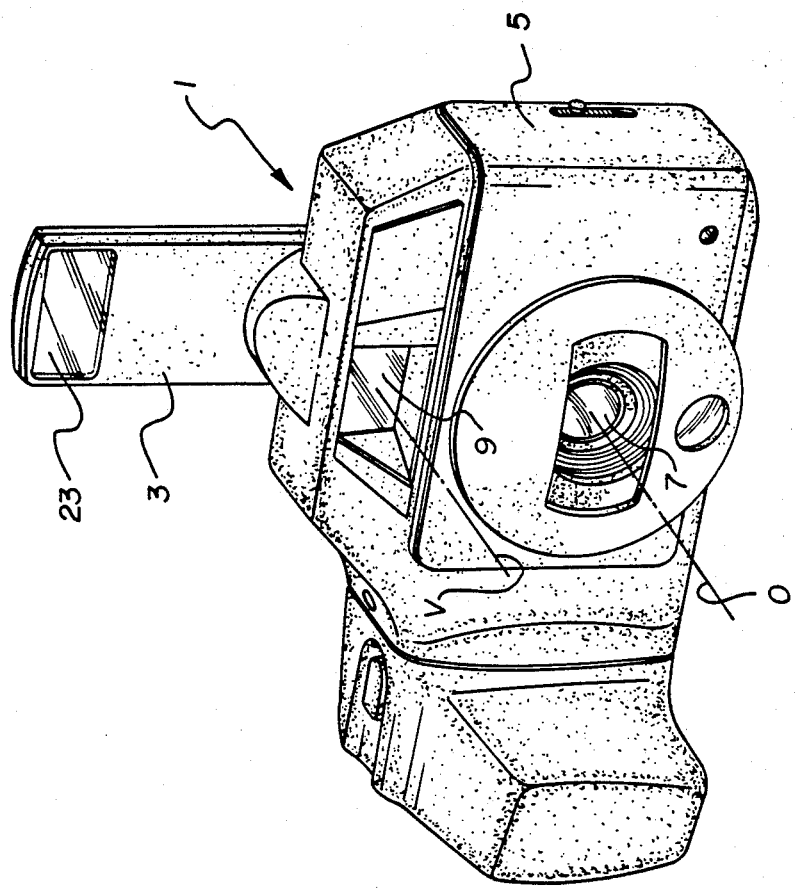
FIG. 5 is a front perspective view of the compact camera, showing the flash unit in an erect operative position.

When it is desired to take a flash exposure, the flash unit 5 is pivoted from its folded position shown in FIGS. 2 and 3 to its elevated position shown in FIGS. 5 and 6. This arrangement allows for improved compactness in that the flash unit 3 does not have to swing in an arc away from the rear face 15 of the camera body 5 as in prior art U.S. Pat. No. 2,688,071. Moreover, since the flash unit 3 is swung generally about the rear viewfinder window 11, rather than about the taking lens 7 as in prior art U.S. Pat. No. 4,666,275, it becomes an easier matter to elevate the flash unit sufficiently higher than the taking lens to substantially prevent red-eye.

The invention has been described with reference to a preferred embodiment. However, it will be understood that variations and modifications can be effected by one having ordinary skill in the art without departing from the scope of the invention.

We claim:

1. An improved photographic camera including a built-in electronic flash unit, wherein (a) a rear viewfinder window is provided on the camera body for viewing a subject to be photographed and (b) mounting means supports said flash unit for movement relative to said camera body between a folded inoperative position against the camera body and an erect operative position elevated higher than said viewfinder window, and wherein the improvement comprises:

said mounting means supports said flash unit for enabling the flash unit to be swung between its folded and erect positions about a pivot axis which extends through said rear viewfinder window.

2. The improvement as recited in claim 1, wherein said mounting means supports said flash unit to locate its pivot axis in coaxial relation with a viewing axis through said rear viewfinder window.

3. The improvement as recited in claim 1, wherein said mounting means supports said flash unit proximate said rear viewfinder window for enabling the flash unit to be swung generally about the viewfinder window.

4. The improvement as recited in claims 2 or 3, wherein said photographic camera includes a taking lens having an optical axis, and wherein said camera body supports said rear viewfinder window to locate its viewing axis substantially parallel to and directly above the optical axis of said taking lens.

5. The improvement as recited in claim 2, wherein said camera body includes a rear face provided with a recessed area having a concave-shaped edge evenly spaced from the pivot axis of said flash unit, said mounting means supports said flash unit to be swung within said recessed area from and to its folded position generally in a plane substantially parallel to said rear face, and said flash unit has a convex-shaped edge arranged in contiguous relation with said concave-shaped edge of the recessed area as the flash unit is swung within the recessed area.

* * * * *